US012665330B2

(12) United States Patent
Lin et al.

(10) Patent No.: US 12,665,330 B2
(45) Date of Patent: Jun. 23, 2026

(54) CONNECTOR ASSEMBLY FOR A SEAT BELT

(71) Applicant: P-TWO INDUSTRIES INC., Taoyuan City (TW)

(72) Inventors: Hsien-Chang Lin, Taoyuan City (TW); Chun-Wei Chang, Taoyuan City (TW)

(73) Assignee: P-TWO INDUSTRIES INC., Taoyuan City (TW)

( * ) Notice: Subject to any disclaimer, the term of this patent is extended or adjusted under 35 U.S.C. 154(b) by 359 days.

(21) Appl. No.: 18/407,638

(22) Filed: Jan. 9, 2024

(65) Prior Publication Data

US 2024/0388025 A1      Nov. 21, 2024

(30) Foreign Application Priority Data

May 18, 2023    (TW) ................................. 112118532

(51) Int. Cl.
| | |
|---|---|
| *H01R 12/75* | (2011.01) |
| *B60R 16/03* | (2006.01) |
| *H01R 12/72* | (2011.01) |
| *H01R 13/52* | (2006.01) |
| *H01R 13/627* | (2006.01) |

(52) U.S. Cl.
CPC ............. *H01R 12/75* (2013.01); *B60R 16/03* (2013.01); *H01R 12/722* (2013.01); *H01R 13/5205* (2013.01); *H01R 13/521* (2013.01); *H01R 13/5219* (2013.01); *H01R 13/627* (2013.01); *H01R 2201/26* (2013.01)

(58) Field of Classification Search
CPC .. H01R 12/75; H01R 12/722; H01R 13/5205; H01R 13/521; H01R 13/5219; H01R 13/627; H01R 13/6275; H01R 2201/26; B60R 16/03
USPC .................................................... 439/55, 350
See application file for complete search history.

(56) References Cited

U.S. PATENT DOCUMENTS

| | | | | |
|---|---|---|---|---|
| 4,200,350 | A * | 4/1980 | Zimmerman, Jr. .. | H01R 13/424 439/752 |
| 8,393,913 | B2 * | 3/2013 | Wu ..................... | H01R 13/6275 439/345 |
| 10,608,381 | B2 * | 3/2020 | Zhou ................... | H01R 13/6581 |
| 11,431,131 | B2 * | 8/2022 | Lv ....................... | H01R 13/6582 |

(Continued)

FOREIGN PATENT DOCUMENTS

| | | |
|---|---|---|
| CN | 111864441 A | 10/2020 |
| CN | 214957407 U | 11/2021 |

(Continued)

*Primary Examiner* — Gary F Paumen
(74) *Attorney, Agent, or Firm* — MUNCY, GEISSLER, OLDS & LOWE, P.C.

(57) ABSTRACT

The connector assembly for a seat belt comprises a wire-end connector and a board-end connector. The wire-end connector and the board-end connector are respectively designed to form an integral structure of the shell and internal components using stoppers and hooks. When the wire-end connector is fitted with the board-end connector in a fitting direction, they are engaged with each other, thereby preventing relative movement in the fitting direction. The connector assembly further includes a multi-level waterproof design for preventing the connector assembly and the circuit board from moisture damage.

10 Claims, 12 Drawing Sheets

(56)                References Cited

U.S. PATENT DOCUMENTS

| 11,695,234 | B2 * | 7/2023 | Simpson | .............. | G02B 6/4246 |
| | | | | | 439/470 |
| 2006/0063415 | A1 * | 3/2006 | de Vanssay | ........ | H01R 13/6275 |
| | | | | | 439/350 |
| 2021/0218201 | A1 * | 7/2021 | Lv | ...................... | H01R 13/6594 |
| 2021/0367381 | A1 * | 11/2021 | Lv | ...................... | H01R 13/6582 |
| 2022/0200202 | A1 * | 6/2022 | Truong | ............... | H01R 13/516 |
| 2023/0029582 | A1 * | 2/2023 | Lin | .................. | H01R 13/62916 |
| 2023/0042161 | A1 * | 2/2023 | Winey | .............. | H01R 13/6272 |
| 2023/0118936 | A1 * | 4/2023 | Fu | ...................... | H01R 13/6582 |
| | | | | | 439/321 |
| 2023/0307870 | A1 * | 9/2023 | Lin | ........................ | H01R 12/75 |

FOREIGN PATENT DOCUMENTS

| TW | M640708 | U | 5/2023 |
| TW | M647450 | U | 10/2023 |

* cited by examiner

1000

1000

CONNECTOR ASSEMBLY FOR A SEAT BELT

CROSS REFERENCE TO RELATED APPLICATION

This application claims the benefit of Taiwanese Patent Application No. 112118532 filed on May 18, 2023, which is incorporated herein by reference.

BACKGROUND OF THE INVENTION

1. Field of the Invention

The present invention relates to a connector assembly, especially a connector assembly for a seat belt.

2. Description of Related Art

With the evolution and development trends in vehicle technology, automotive electronics have been developed and applied widely. An electric connector for seat belts is a crucial component. Unlike traditional seat belts that primarily focus on structural design, the existing electric connector for the seat belts functions to connect the seat belts with the electronic system of the vehicle. This integration aims to provide passengers and drivers with higher safety and a better riding experience.

For example, the electric connector for seat belts can be connected to a driving monitoring system. If it is detected that the driver or passenger is not wearing a seat belt, an alarm will be issued, or even the driving operation of the vehicle may be restricted. In another application where the seat belt is connected to the airbag system, the seat belt is connected to the seat belt tension sensor and the airbag system through the electric connector. In the event of a collision, the seat belt tension sensor identifies the tension force on the seat belt to determine whether to activate the airbag system, ensuring the safety of passengers. If a minor collision is detected, the airbag system remains inactive to prevent false activation.

In addition to their role in transmitting electric signals, electric connectors for seat belts must adhere to the fundamental safety design requirements for vehicles. As a result, modern electric connectors for seat belts have to be capable of withstanding high tensile forces and protecting electronic components from moisture damage.

SUMMARY OF THE INVENTION

The main objective of the present invention is to provide a connector assembly for a seat belt, including a wire-end connector and a board-end connector each of which is designed in such a manner that a shell is fixed to an insulator main body by means of a plurality of stoppers and hooks. When the wire-end connector and the board-end connector are fitted with each other in a fitting direction, they are engaged with each other so as to prevent relative movement between the wire-end connector and the board-end connector in the fitting direction and is capable of resisting a great pulling force. The connector assembly is further equipped with a sealing ring, a grommet and sealing glue to form a multi-level waterproof structure for preventing the wire-end connector, the board-end connector and the circuit board from moisture damage.

To achieve the above-mentioned objective, the present invention discloses a connector assembly for a seat belt, which comprises a wire-end connector and a board-end connector. The wire-end connector includes: a first shell, a first main body and a plurality of first terminals, wherein the first shell is fixed to the first main body and has a first engaging portion, the first main body has a fitting plug end, a wire insertion end, a first accommodating space and a spacer, the wire insertion end is opposite to the fitting plug end, the first accommodating space is formed between the fitting plug end and the wire insertion end, the spacer is arranged at the wire insertion end, and the plurality of first terminals are arranged in the first accommodating space and respectively connected with a plurality of wires, and the plurality of wires extend out of the first shell through the spacer. The board-end connector to be fitted with the wire-end connector includes a second shell, a second main body and a plurality of second terminals, wherein the second shell is fixed to the second main body and has a second engaging portion, the second main body has a fitting socket end, a terminal insertion end and a second accommodating space, the terminal insertion end is opposite to the fitting socket end, the second accommodating space is formed between the fitting socket end and the terminal insertion end, and the plurality of second terminals are arranged in the second accommodating space and extend out of the second shell through the terminal insertion end for connection to a circuit board. When the wire-end connector is fitted with the board-end connector in a fitting direction, the fitting plug end is inserted into the second accommodating space through the fitting socket end, and the plurality of first terminals are in electric contact with the plurality of second terminals, and the first engaging portion is engaged with the second engaging portion so as to prevent relative movement between the wire-end connector and the board-end connector in the fitting direction.

The first shell further includes a first stop portion and a second stop portion. The first main body further includes a stop surface and a retaining opening. The first stop portion is abutted against the stop surface, and the second stop portion is engaged with the retaining opening to prevent movement of the first main body in a direction opposite to the fitting direction so that the first shell is fixed to the first main body.

In one embodiment, the connector assembly further includes a connector position assurance, which is slidably fitted on the first shell. When the connector position assurance is slidably moved to a locked position, the connector position assurance is partially inserted into a gap between the first engaging portion and the first main body, thereby preventing movement of the first engaging portion.

The first shell further includes a first hook portion and a first inward detent portion, the first hook portion is abutted against the spacer, and the first inward detent portion is abutted against the first main body.

The second shell further includes a second hook portion and a second inward detent portion, the second hook portion is abutted against the terminal insertion end, and the second inward detent portion is abutted against the second main body.

The second main body further includes a protrusion, and the second shell further includes a notch. When the second shell is attached to the second main body, the protrusion is fitted into the notch.

The spacer includes a central plate and two side arms, and the side arms are provided for engagement with the first main body so that the wire insertion end is closed by the central plate.

The central plate has a plurality of through holes through which the plurality of wires extend respectively.

In one embodiment, the wire-end connector further includes a sealing ring and a grommet, the sealing ring is fitted on the fitting plug end for sealing engagement with the second main body, and the grommet is arranged on the spacer for sealing engagement with the first main body and for sealing engagement with the plurality of wires.

The board-end connector further includes sealing glue, which is disposed on the terminal insertion end for sealing engagement with the plurality of second terminals.

The above and other objects and advantages of the present invention will become apparent from the accompanying drawings and the following detailed description.

DETAILED DESCRIPTION OF THE PREFERRED EMBODIMENT

Figure 1:
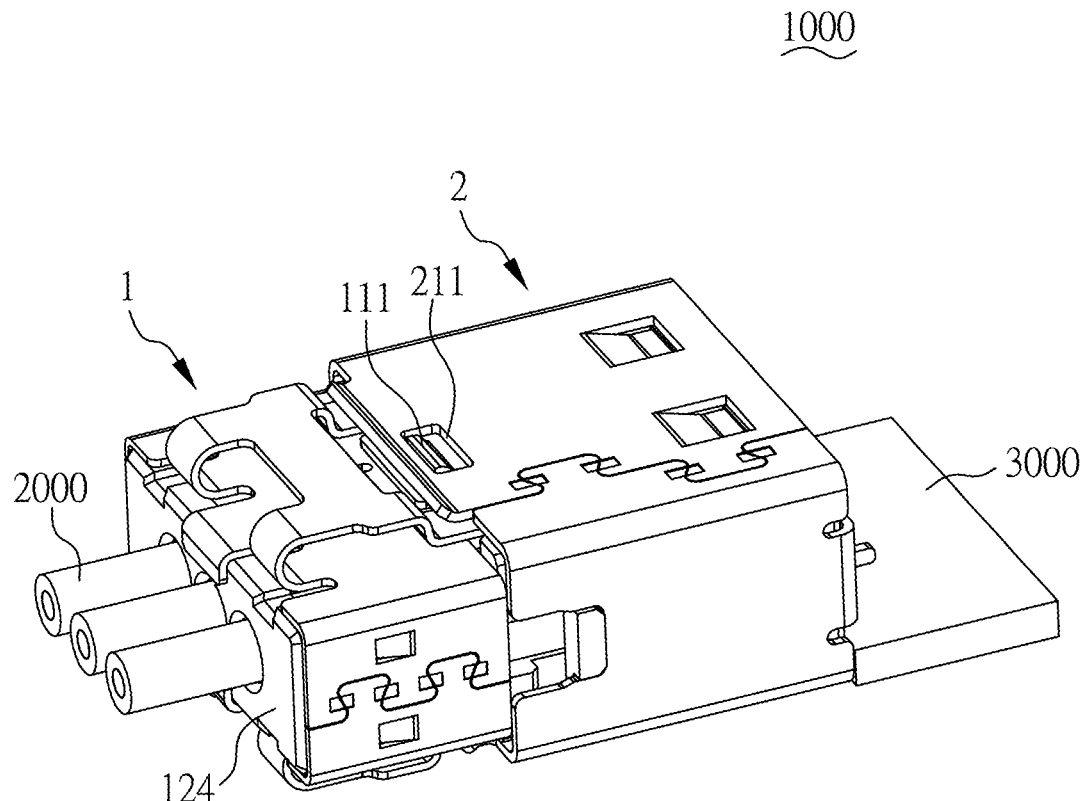
FIG. 1 is a perspective view of the connector assembly according to one embodiment of the present invention.

Reference will now be made in detail to the present embodiments of the invention, examples of which are illustrated in the accompanying drawings, and are not intended to limit the present invention, applications, or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
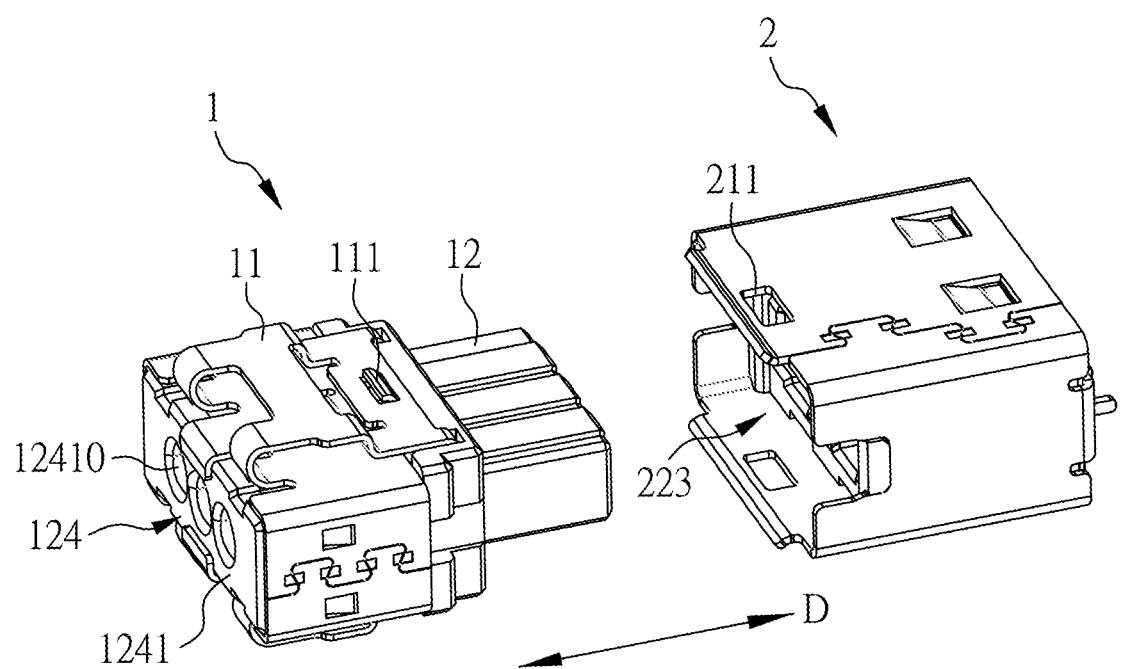
FIG. 2 is an exploded perspective view of the connector assembly according to one embodiment of the present invention.

Reference is made to FIG. 1 and FIG. 2. FIG. 1 is a perspective view of the connector assembly 1000 of the present invention, and FIG. 2 is an exploded view of the connector assembly 1000. The connector assembly 1000 of the present invention mainly comprises a wire-end connector 1 and a board-end connector 2, wherein the wire-end connector 1 is connected with a plurality of wires 2000, and the board-end connector 2 is connected with a circuit board 3000. The wire-end connector 1 and the board-end connector 2 can be fitted to each other in a fitting direction D.

4

Figure 3:
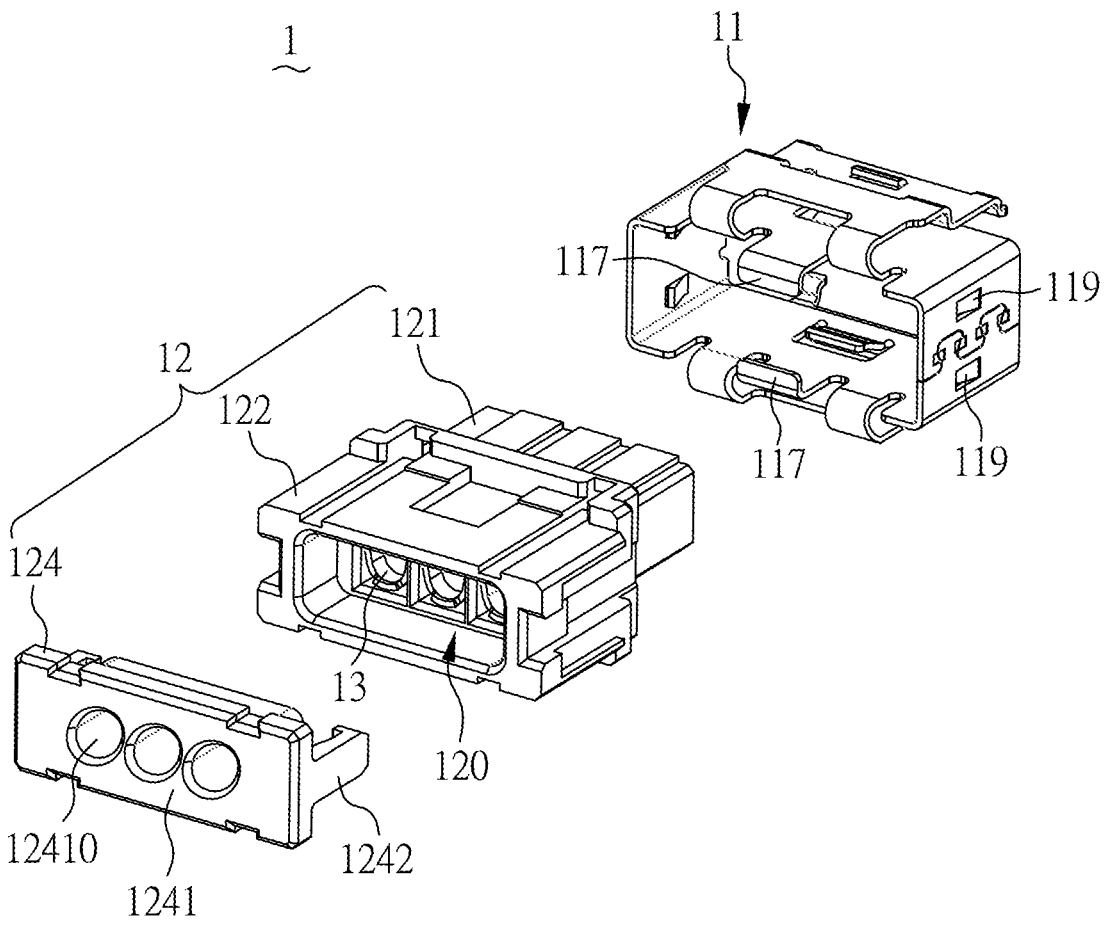
FIG. 3 is an exploded view of the wire-end connector.
Figure 4:
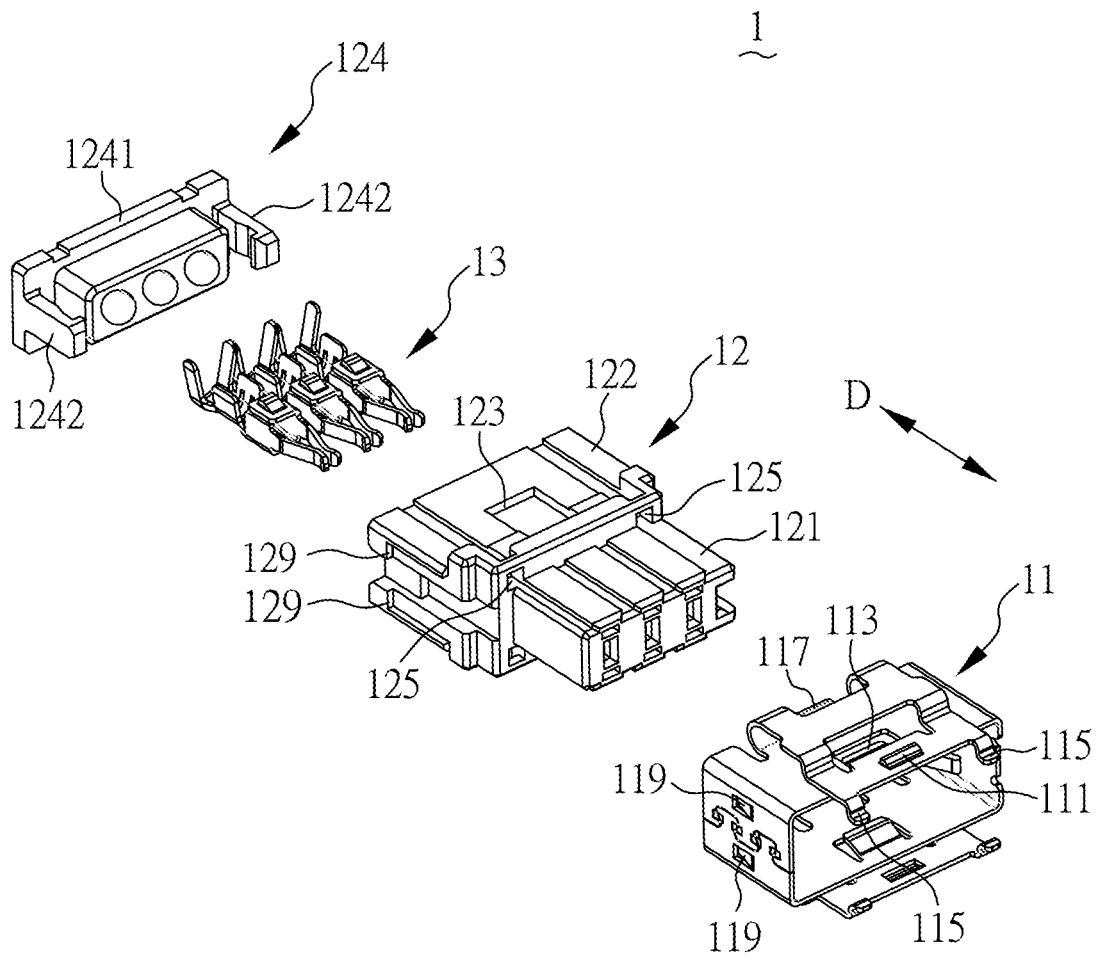
FIG. 4 is an another exploded view of the wire-end connector.

The wire-end connector 1 will be described by referring to FIG. 3 and FIG. 4, in which FIG. 3 is an exploded view of the wire-end connector 1, and FIG. 4 is another exploded view of the wired-end connector 1. The wire-end connector 1 includes a first shell 11, a first main body 12 and a plurality of first terminals 13. The first shell 11 is fixed to the first main body 12, and the first main body 12 includes a fitting plug end 121, a wire insertion end 122, a first accommodating space 120 and a spacer 124. The wire insertion end 122 is opposite to the fitting plug end 121, and the first accommodating space 120 is formed between the fitting plug end 121 and the wire insertion end 122.

Reference is to FIG. 1 and FIG. 2 again. The spacer 124 including a central plate 1241 and two side arms 1242 is arranged on the wire insertion end 122, and the central plate 1241 is formed with a plurality of through holes 12410, through which the wire 2000 extend, so that the plurality of wires 2000 extend out of the first shell 11 through the through hole 12410 of the spacer 124. The side arms 1242 are engaged with the side wall of the first main body 12 so that the central plate 1241 is configured to close the wire insertion end 122. As shown in FIG. 3, the plurality of first terminals 13 is disposed in the first accommodating space 120 for connection with the plurality of wires 2000.

The wire-end connector 1 is designed so that the first shell 11 can be firmly attached to the first main body 12. Preferably, the first shell 11 is made of metal, and the wire insertion end 122 and the fitting plug end 121 are made of insulating material. As shown in FIG. 4, in this embodiment, the first shell 11 has a first engaging portion 111, a first stop portion 113 and two second stop portions 115 (the bent tabs shown in the figure), and the first main body 12 has a stop surface 123 and two retaining openings 125. After the first shell 11 fitted to the first main body 12 in the fitting direction D, the first stop portion 113 is abutted against the stop surface 123, and the second stop portions 115 are inserted into in the retaining holes 125, respectively. By means of the first stop portion 113 and the second stop portions 115, the first shell 11 is retained on the first main body 12.

In this embodiment, the first shell 11 further includes at least one first hook portion 117 and at least one first inward detent portion 119. As shown in FIG. 3 and FIG. 4, the first shell 11 has two first hook portions 117 that are vertically opposite to each other, and two first inward detent portions 119 are formed on each of the left side and the right side. In an assembled state, the first hook portions 117 are abutted against the spacer 124 (as shown in FIG. 1 and FIG. 2), and the first inward detent portions 119 are abutted against the stop surfaces 129 formed on both sides of the first main body 12. Thereby, the first hook portions 117 and the first inward detent portion 119 function to prevent the relative movement between the first main body 12 and the first shell 11 in the assembling direction D so that the first shell 11 is firmly attached to the first body 12.

In order to firmly attach the first shell 11 to the first main body 12, the structure of the first shell 11 and the structure of the first main body 12 are designed so that parts of the first shell 11 are abutted against parts of the first main body 12.

Figure 5:
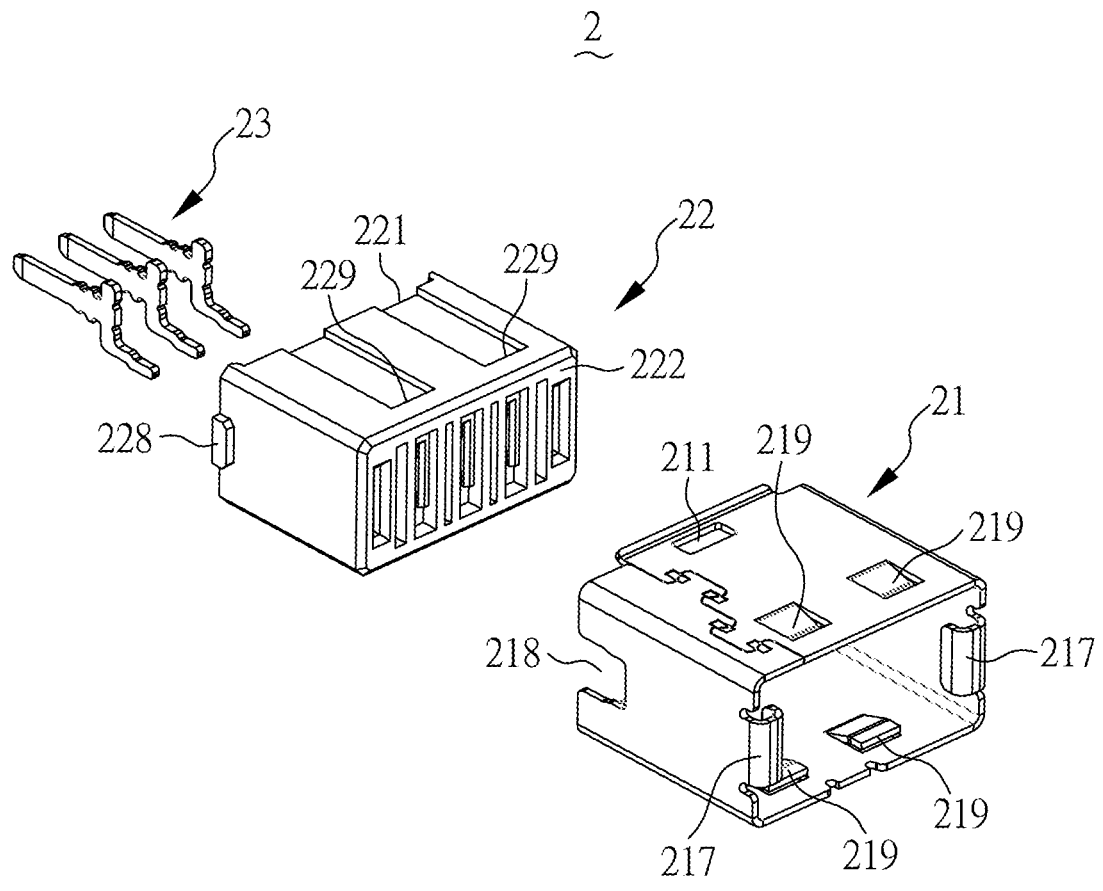
FIG. 5 is an exploded view of the board-end connector.

Next, the board-end connector 2 is described by referring to FIG. 5. The board-end connector 2 includes a second shell 21, a second main body 22 and a plurality of second terminals 23. The second shell 21 has a second engaging portion 211. The second shell 21 is attached to the second main body 22. The second main body 22 includes a fitting socket end 221, a terminal insertion end 222 and a second accommodating space 223 (as shown in FIG. 2). The terminal insertion end 222 is opposite to the fitting socket end 221, and the second accommodating space 223 is formed between the fitting socket end 221 and the terminal insertion end 222. The second terminal 23 is disposed in the second accommodating space 223 and partially extends out of the second shell 21 through the terminal insertion end 222 for connection of the circuit board 3000 (as shown in FIG. 1).

The second shell 21 further includes at least one second hook portion 217 and at least one second inward detent portion 219. As shown in FIG. 5, the second shell 21 of this embodiment has two second hook portions 217 disposed opposite to each other in a lateral direction. Each of the upper surface and the lower surface of the second shell 21 is formed with two second inward detent portions 219, which can be abutted against the corresponding stop surfaces 229 formed on the top and bottom of the second main body 22 after attaching the second shell 21 to the second main body 22. The second hook portions 217 and the second inward detent portion 219 are configured to prevent relative movement between the second main body 22 and the second shell 21 so that the second shell is firmly attached to the second main body 22.

The second shell 21 further includes a notch 218, and the second main body 22 further includes a protrusion 228. When the second shell 21 is attached to the second main body 22, the protrusion 228 is exactly fitted into the notch 218. In cooperation of the above-mentioned second hook portion 217 and second inward detent portion 219, it can be ensured that the second main body 22 is firmly attached to the second shell 21.

It should be noted that the second shell 21 is preferably made of metal, and the second main body 22 is preferably made of insulating material. The board-end connector 2 is designed so that the second shell 21 and the second main body 22 interfere with each other. As such, the second shell 21 is firmly attached to the second main body 22.

Figure 6:
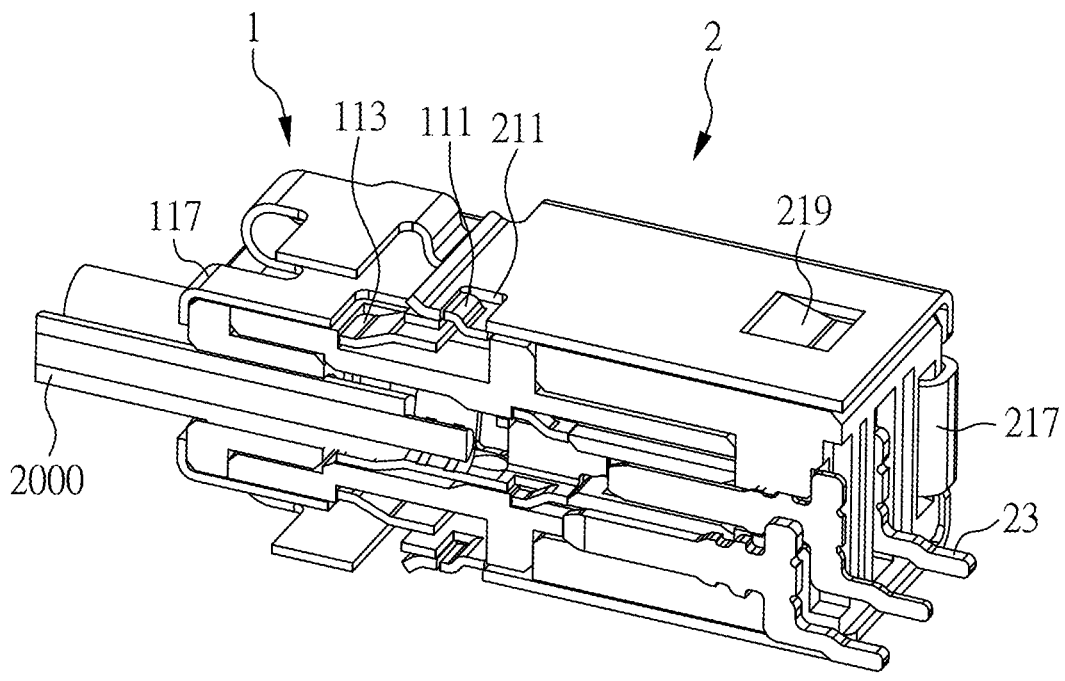
FIG. 6 is a cross-sectional view of the connector assembly.

Reference is made to FIG. 6 which is a cross sectional view. When the wire-end connector 1 and the board-end connector 2 are assembled along the assembling direction D, the fitting plug end 121 is inserted into the second accommodating space 223 through the fitting socket end 221 so that the plurality of first terminals 13 are in electrical contact with the plurality of second terminals 23. The first engaging portion 111 is engaged with the second engaging portion 211 so as to prevent the relative movement between the wire-end connector 1 and the board-end connector 2 in the assembling direction D. The first engaging portion 111 and the second buckle portion 211 are capable of resisting a great tensile force as they are made of metal. It should be noted that, in this embodiment, the first engaging portion 111 and the second engaging portion 211 are symmetrically arranged on the upper surface and lower surface of the connector assembly 1000. By exerting a pressing force onto the upper surface and the lower surface of the first shell 11, the first engaging portion 111 and the second engaging portion 211 can be disengaged from each other.

Figure 7:
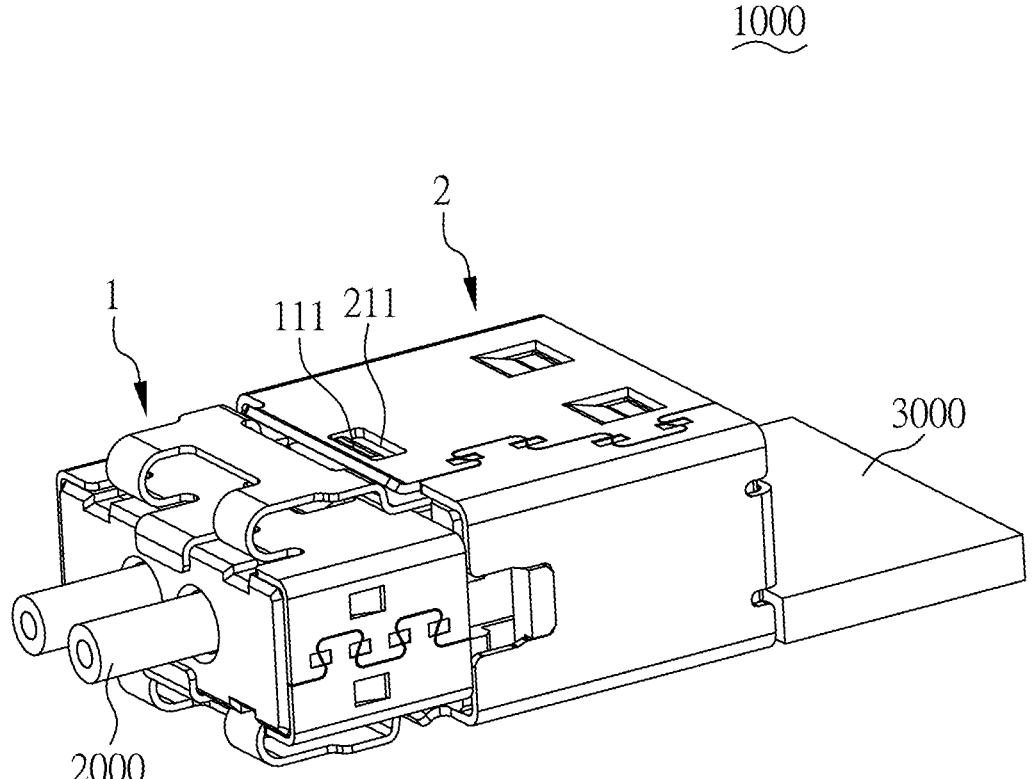
FIG. 7 is a perspective view of the connector assembly according to another embodiment of the present invention.
Figure 8:
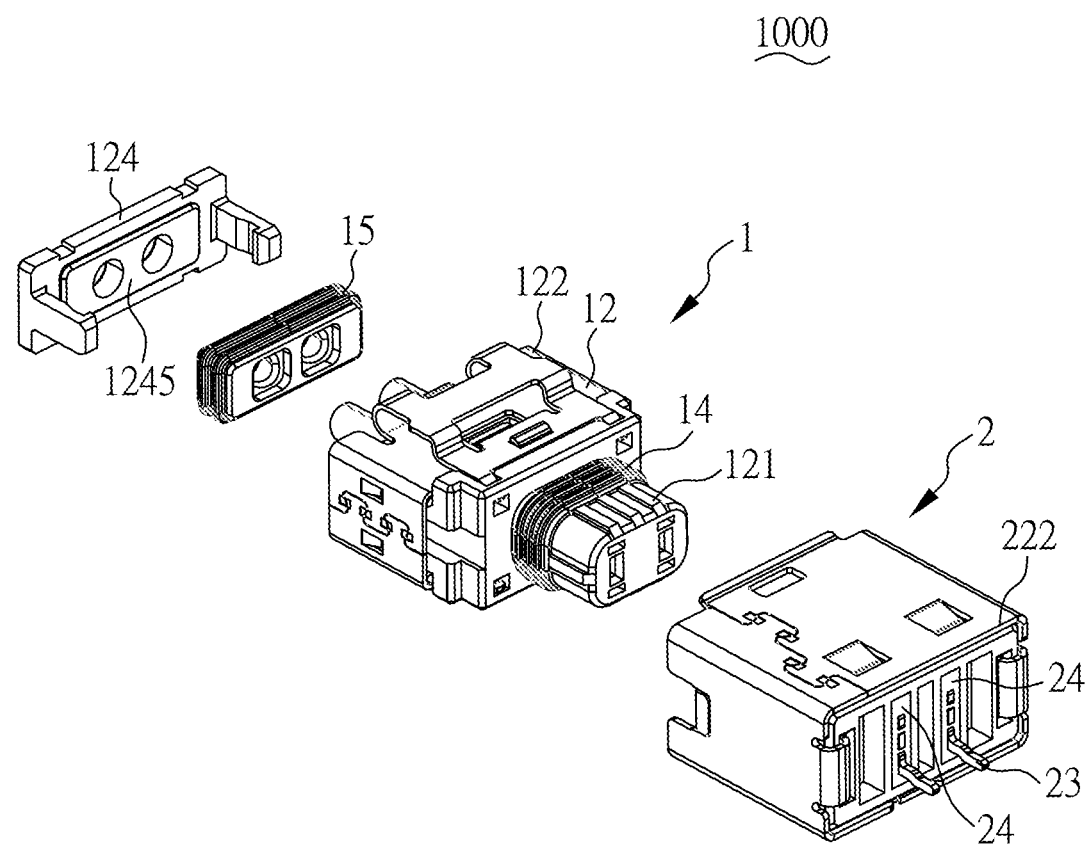
FIG. 8 is an exploded view of the connector assembly according to another embodiment of the present invention.
Figure 9:
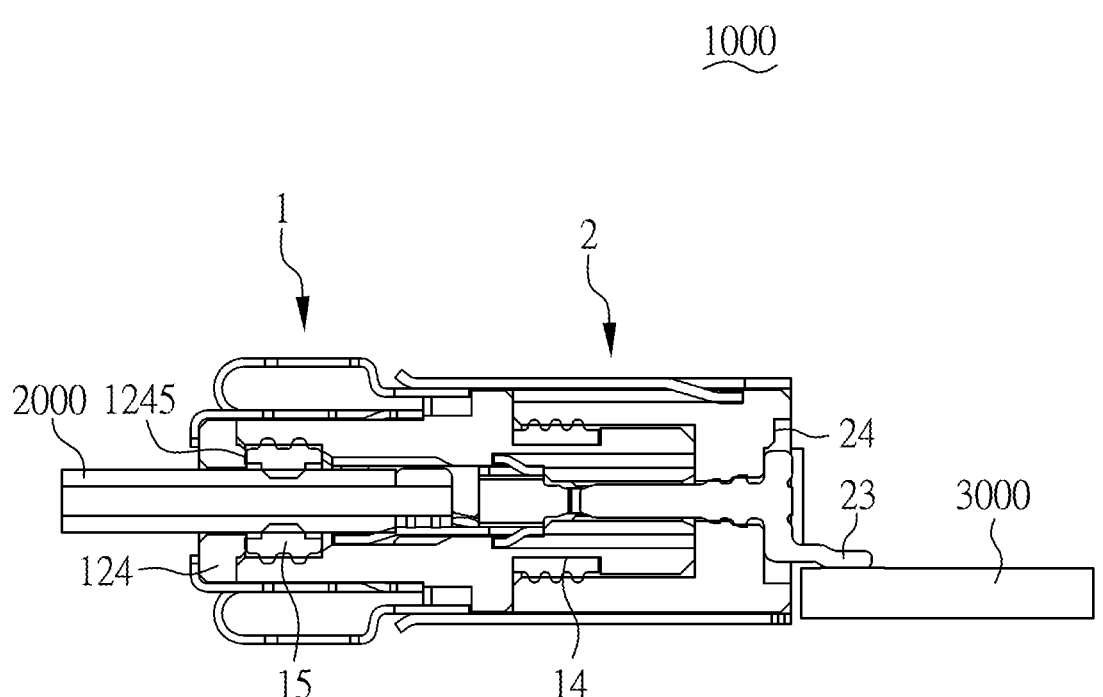
FIG. 9 is a cross-sectional view of the connector assembly according to another embodiment of the present invention.

In the connector assembly 1000 according to another embodiment, the waterproof structure is taken into consideration. As shown in FIG. 7, the elements and structures of this embodiment are substantially included in the foregoing embodiments, and the description thereof is omitted. Reference is made to FIG. 8 and FIG. 9, wherein FIG. 8 is an exploded view of this embodiment, and FIG. 9 is a cross-sectional view of this embodiment. The wire-end connector 1 of this embodiment further includes a sealing ring 14 and a grommet 15. The sealing ring 14 is fitted on the fitting plug end 121. When the wire-end connector 1 is engaged with the board-end connector 2, the sealing ring 14 is tightly fitted into the second main body 22. The grommet 15 is arranged on the spacer 124, and the wires 2000 are inserted through the grommet passages formed on the grommet 15. The spacer 124 further has a protrusion 1245. When the spacer 124 is engaged with the first main body 12, the grommet 15 is compressed by the protrusion 1245 so that the grommet 15 is tightly disposed between the spacer 124 and the wire insertion end 122 and thus is tightly fitted into the first main body 12.

The board-end connector 2 further includes sealing glue 24 disposed on the terminal insertion end 222 for sealing the pin holes for the plurality of second terminals 23.

Accordingly, external moisture is prevented from passing through the grommet 15, the sealing ring 14 and the sealing glue 24 and thus from entering the circuit board 3000 so that the electronic components on the circuit board 3000 can be protected from moisture damage.

Figure 10:
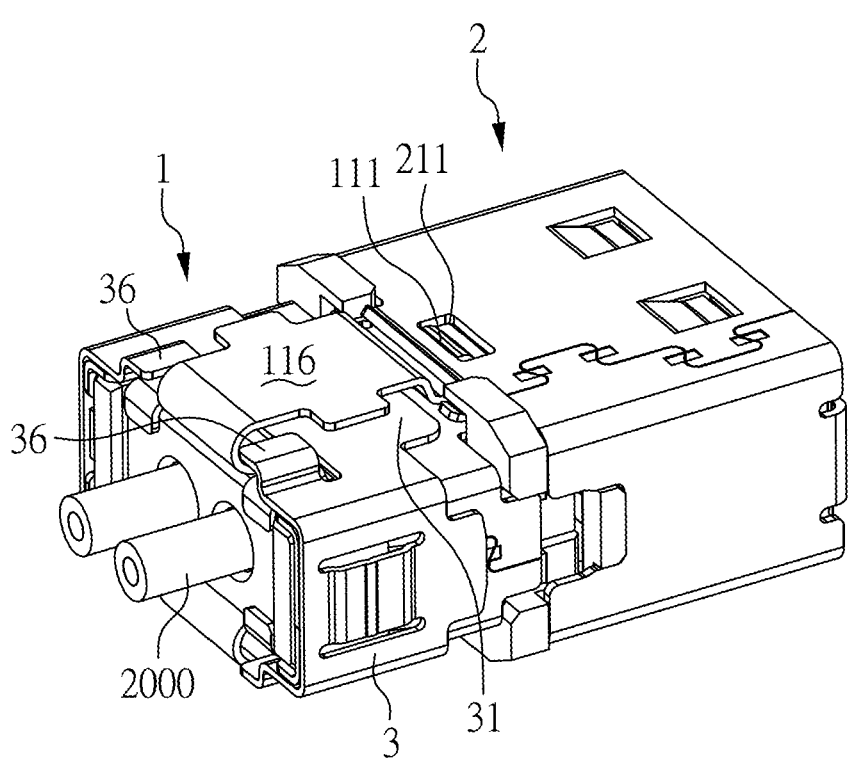
FIG. 10 is a perspective view of the connector assembly according to yet another embodiment of the present invention.
Figure 11:
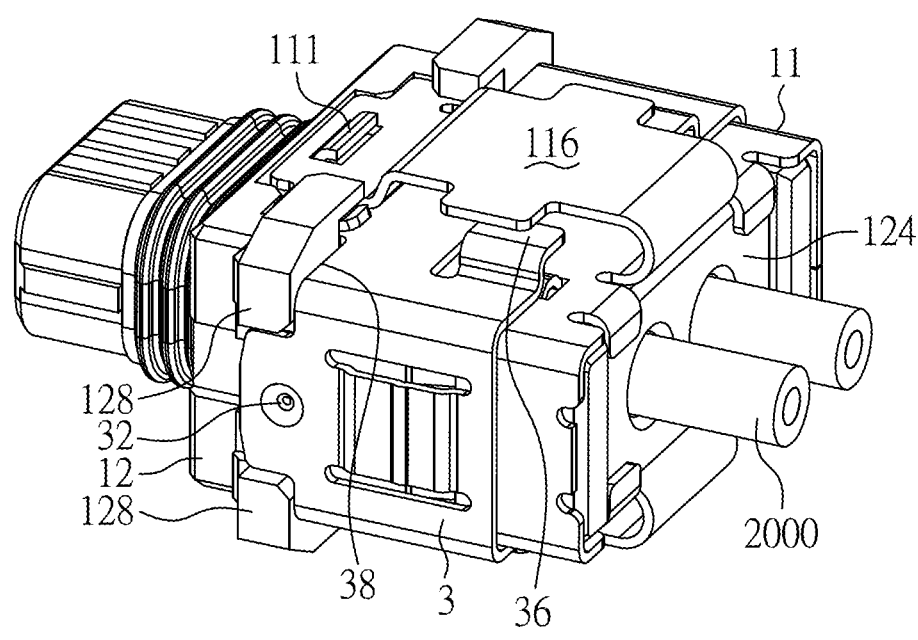
FIG. 11 is a perspective view of the wire-end connector having a connector position assurance in a locked position.
Figure 12:
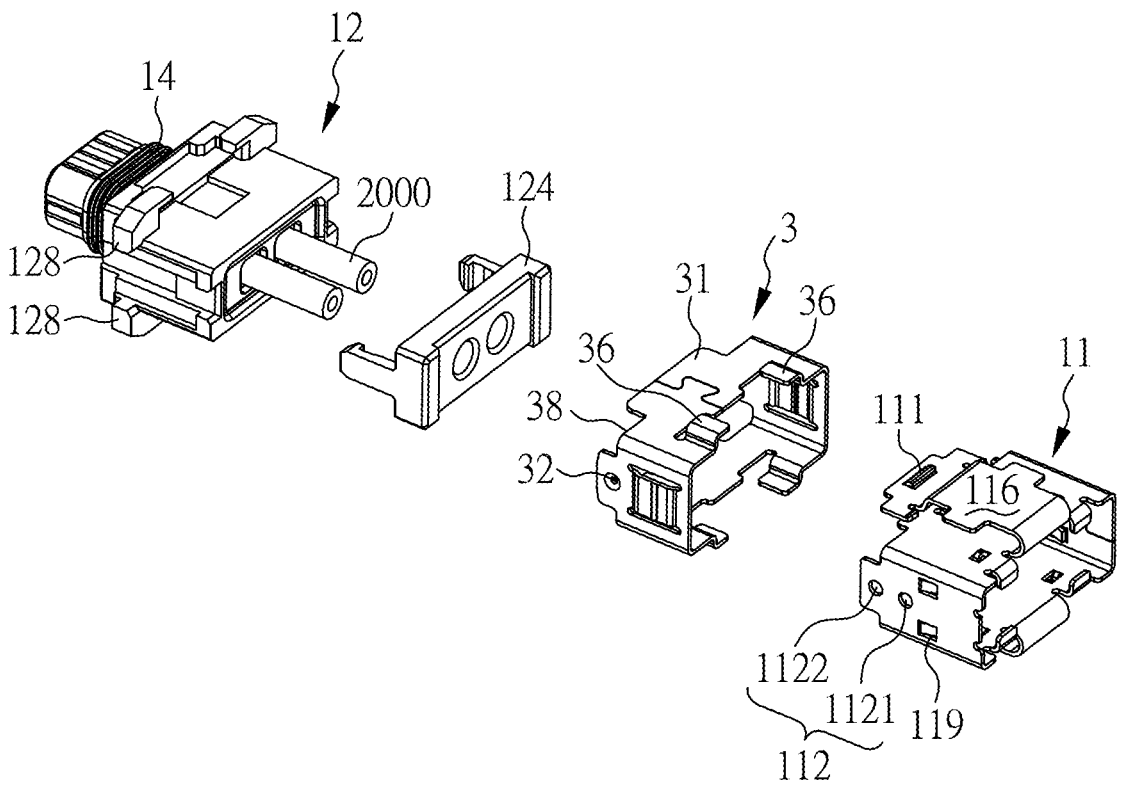
FIG. 12 is an exploded view of the wire-end connector having the connector position assurance.

In yet another embodiment, the connector assembly 1000 of the present invention may further include a connector positioning assurance (CPA), which serves as a secondary locking structure of the connector assembly. Reference is made to FIGS. 10 to 12, wherein FIG. 10 is a perspective view of the connector assembly 1000 of this embodiment when the connector position assurance 3 is in an unlocked position, FIG. 11 is a view schematically showing that the connector position assurance 3 is positioned in a locked position, and FIG. 12 is an exploded view of the wire-end connector 1 and the connector position assurance 3.

In this embodiment, the connector position assurance 3 is slidably disposed on the first shell 11 and movable between an unlocked position and a locked position. The connector position assurance 3 includes a front extension plate 31, an abutment portion 36 and a front stop portion 38. FIG. 10 illustrates that the connector position assurance 3 is positioned in the unlocked position. At this time, the first engaging portion 111 can be disengaged from the second engaging portion 211 by pushing the pressed portion 116 of the first shell 11.

Reference is made to FIG. 11 which schematically shows that the connector position assurance 3 is positioned in a locked position when seen from another view angle. The connector position assurance 3 is moved forward until the front stopper 38 is abutted against the limiting portion 12 of the first main body 12. At this time the connector position assurance 3 is positioned in the locked position. When the connector position assurance 3 is positioned in the locked position, the front extension plate 31 is partially inserted into the gap between the first engaging portion 111 and the first main body 12. In this way, if a user tries to push the pressed portion 116 of the first shell 11, movement of the first engaging portion 111 can be prevented. In addition, the abutment portion 36 is located exactly below the pressed portion 116 for preventing the pressed portion 116 from being pushed downward.

Preferably, the connector position assurance 3 further includes a positioning protrusion 32, and the first shell 11 further includes a plurality of positioning holes 112. As shown in FIG. 12, a first positioning hole 1121 and a second positioning hole 1122 are provided in this embodiment. When the connector position assurance 3 is positioned in the unlocked position, the positioning protrusion 32 is fitted into the first positioning hole 1121. When the connector position assurance 3 is positioned in the locked position, the positioning protrusion 32 is fitted into the second positioning hole 1122. In this way, a haptic feedback is generated when switching the connector position assurance 3. When the connector position assurance 3 is positioned in the unlocked position or the locked position, it is not easy to change the position of the connector position assurance 3.

After the wire-end connector 1 and the board-end connector 2 are assembled, the connector position assurance 3 can be further operated to stop the movement of the first engaging portion 111. Even if the pressed portion 116 of the first shell 11 is pushed, the first engaging portion 111 and the second engaging portion 211 cannot be easily disengaged due to the fact that the movement of the first engaging portion 111 is stopped. As such, the connector assembly 1000 can be prevented from be unlocked by the incorrect operation, and the connector assembly 1000 is capable of resisting a great tensile force in the assembled state.

The wire-end connector and the board-end connector of the connector assembly of the present invention are formed with the stop portions and the hook portions, so that the shells are firmly attached to the main bodies. After the wire-end connector and the board-end connector are assembled in the assembling direction, the wire-end connector and the board-end connector are engaged with each other for preventing the relative movement of the wire-end connector and the board-end connector in the assembling direction and are capable of resisting a great tensile force. In addition, the connector assembly is equipped with a grommet, a sealing ring and sealing glue to form a multi-stage waterproof structure to ensure that moisture cannot enter the wire end connector, the board-side connector and the circuit board.

The preferred embodiments of the present invention are illustrative only, and the claimed inventions are not limited to the details disclosed in the drawings and the specification. Further, those skilled in the art will appreciate that various modifications and variations can be made without departing from the scope or spirit of the invention. Accordingly, it is intended that it have the full scope permitted by the language of the following claims.

What is claimed is:

1. A connector assembly for a seat belt, comprising:
a wire-end connector, including:
a first shell having a first engaging portion;
a first main body to which the first shell is fixed, the first main body including a fitting plug end, a wire insertion end, a first accommodating space and a spacer, wherein the wire insertion end is opposite to the fitting plug end, the first accommodating space is formed between the fitting plug end and the wire insertion end, and the spacer is arranged at the wire insertion end; and
a plurality of first terminals arranged in the first accommodating space and respectively connected with a plurality of wires, the plurality of wires extending out of the first shell through the spacer; and
a board-end connector to be fitted with the wire-end connector, the board-end connector including:
a second shell having a second engaging portion;
a second main body to which the second shell is fixed, the second main body having a fitting socket end, a terminal insertion end and a second accommodating space, wherein the terminal insertion end is opposite to the fitting socket end, the second accommodating space is formed between the fitting socket end and the terminal insertion end; and a plurality of second terminals arranged in the second accommodating space and extending out of the second shell through the terminal insertion end for connection to a circuit board;
wherein, when the wire-end connector is fitted with the board-end connector in a fitting direction, the fitting plug end is inserted into the second accommodating space through the fitting socket end, and the plurality of first terminals are in electric contact with the plurality of second terminals, and the first engaging portion is engaged with the second engaging portion so as to prevent relative movement between the wire-end connector and the board-end connector in the fitting direction.

2. The connector assembly of claim 1, wherein the first shell further includes a first stop portion and a second stop portion, the first main body further includes a stop surface and a retaining opening, the first stop portion is abutted against the stop surface, the second stop portion is engaged with the retaining opening to prevent movement of the first main body in a direction opposite to the fitting direction so that the first shell is fixed to the first main body.

3. The connector assembly of claim 1, further including a connector position assurance, which is slidably fitted on the first shell, wherein when the connector position assurance is slidably moved to a locked position, the connector position assurance is partially inserted into a gap between the first engaging portion and the first main body, thereby preventing movement of the first engaging portion.

4. The connector assembly of claim 2, wherein the first shell further includes a first hook portion and a first inward detent portion, the first hook portion is abutted against the spacer, and the first inward detent portion is abutted against the first main body.

5. The connector assembly of claim 4, wherein the second shell further includes a second hook portion and a second inward detent portion, the second hook portion is abutted against the terminal insertion end, and the second inward detent portion is abutted against the second main body.

6. The connector assembly of claim 5, wherein the second main body further includes a protrusion, and the second shell further includes a notch, and when the second shell is attached to the second main body, the protrusion is fitted into the notch.

7. The connector assembly of claim 5, wherein the spacer includes a central plate and two side arms, and the side arms are provided for engagement with the first main body so that the wire insertion end is closed by the central plate.

8. The connector assembly of claim 7, wherein the central plate has a plurality of through holes through which the plurality of wires extend respectively.

9. The connector assembly of claim 5, wherein the wire-end connector further includes a sealing ring and a grommet, the sealing ring is fitted on the fitting plug end for sealing engagement with the second main body, and the grommet is arranged on the spacer for sealing engagement with the first main body and for sealing engagement with the plurality of wires.

10. The connector assembly of claim 9, wherein the board-end connector further includes sealing glue, which is disposed on the terminal insertion end for seal engagement with the plurality of second terminals.

* * * * *